(No Model.)

A. M. HOWARD.
WHEEL TIRE.

No. 577,257.  Patented Feb. 16, 1897.

Witnesses.  Anson M. Howard,
Inventor.
By Atty.
Earle Seymour

UNITED STATES PATENT OFFICE.

ANSON M. HOWARD, OF NEW HAVEN, CONNECTICUT.

WHEEL-TIRE.

SPECIFICATION forming part of Letters Patent No. 577,257, dated February 16, 1897.

Application filed August 31, 1896. Serial No. 604,412. (No model.)

*To all whom it may concern:*

Be it known that I, ANSON M. HOWARD, of New Haven, in the county of New Haven and State of Connecticut, have invented a new Improvement in Wheel-Tires; and I do hereby declare the following, when taken in connection with the accompanying drawings and the letters of reference marked thereon, to be a full, clear, and exact description of the same, and which said drawings constitute part of this specification, and represent, in—

Figure 1:
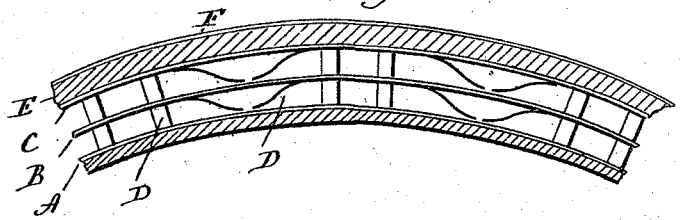
Figure 2:
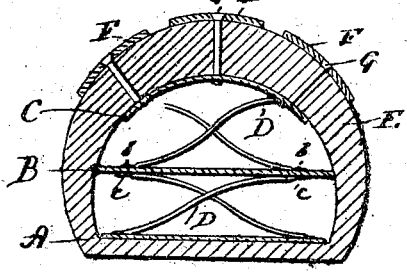
Figure 3:
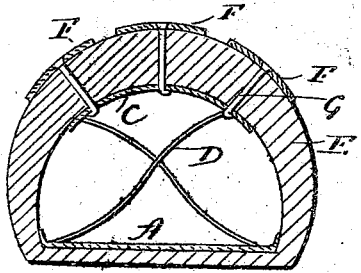
Figure 4:

Figure 1, a sectional side view of a portion of a tire embodying my invention; Fig. 2, a transverse section of the same; Fig. 3, a modification; Fig. 4, an enlarged view illustrating the preferred manner of connecting the springs with the strips.

This invention relates to an improvement in tires for wheels, and while applicable to cycle-wheels it is intended for heavier vehicles, as carriages, &c., and particularly applicable to the rim shown and described in Patent No. 562,224, granted to me June 16, 1896.

The object of the invention is to produce a strong spring-tire which has the qualities of a pneumatic tire yet avoids the possible collapsing in case it becomes punctured; and the invention consists in the construction, as hereinafter described, and particularly recited in the claims.

The tire will preferably consist of three metal plates A B C, arranged concentrically, the upper plate C being concavo-convex. Between these plates flat sheet-metal springs D are arranged in pairs, alternate pairs extending longitudinally with the tire and the intermediate pairs extending transversely thereto, as shown in Fig. 1. Preferably these springs will be secured in position by forming the plates with slots $a$ and raising one edge of the slot to form a shoulder $b$, as shown in Fig. 4, and offsetting the ends $c$ of the springs, so that when the end is passed through the slot $a$ the end may take a bearing beneath the shoulder $b$. These springs are inclosed in a casing E, of any suitable material, which casing is attached to the upper or bowed plate C. To protect this casing, I preferably employ three or more narrow strips of metal F, which extend around the tire and are held in place by pins G, which extend through the strips, the casing E, and the upper plate C, beneath which the ends are upset, as shown in Figs. 2 and 3.

Instead of employing three plates, as just described, in some cases two plates may be sufficient, as shown in Fig. 3. While I prefer to arrange the springs in pairs, as shown in Fig. 1, they may be alternated in any regular succession, the object of alternating them being to prevent lateral or circumferential displacement.

This tire may be placed on any suitable rim, within which it may be held by friction, or, if necessary, otherwise secured.

With a tire constructed as shown and described a high degree of flexibility is attained and the danger from puncture avoided.

I claim—

1. The herein-described tire for vehicle-wheels, consisting of two plates connected by springs arranged in succession and alternately extending transversely and longitudinally to the tire, and a casing inclosing said plate.

2. The herein-described tire for vehicle-wheels consisting of a flat plate and a transversely-bowed plate, said plates connected by springs arranged in succession and alternately extending transversely and longitudinally to the tire, and a casing inclosing said plates.

3. The herein-described tire for vehicle-wheels consisting of a flat plate and a transversely-bowed plate, said plates connected by alternately-arranged springs extending transversely and longitudinally, a casing inclosing said plates, and longitudinal strips applied to the outer face of said casing and connected with the bowed plate, substantially as described.

In testimony whereof I have signed this specification in the presence of two subscribing witnesses.

ANSON M. HOWARD.

Witnesses:
FRED. C. EARLE,
LILLIAN D. KELSEY.